(12) United States Patent
Shiga

(10) Patent No.: US 7,494,007 B2
(45) Date of Patent: Feb. 24, 2009

(54) DISK CASING WITH BENT LOWER INDEX CARD

(75) Inventor: Hideaki Shiga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 11/373,207

(22) Filed: Mar. 13, 2006

(65) Prior Publication Data
US 2006/0207896 A1  Sep. 21, 2006

(30) Foreign Application Priority Data
Mar. 15, 2005  (JP) .............................. 2005-073033

(51) Int. Cl.
*B65D 85/30* (2006.01)
*B65D 71/00* (2006.01)
(52) U.S. Cl. .................................. 206/308.1; 206/232
(58) Field of Classification Search .............. 206/232, 206/308.1, 308.2, 309–313
See application file for complete search history.

(56) References Cited

U.S. PATENT DOCUMENTS

| 5,284,243 A | * | 2/1994 | Gelardi et al. | ........... 206/308.1 |
|---|---|---|---|---|
| 5,544,741 A | * | 8/1996 | Fantone et al. | ........... 206/308.1 |
| 5,960,948 A | | 10/1999 | Shiga et al. | |
| 6,409,012 B2 | | 6/2002 | Shiga et al. | |
| 6,672,453 B1 | | 1/2004 | Itey | |
| 7,353,942 B2 | * | 4/2008 | Lee et al. | .................. 206/308.1 |

FOREIGN PATENT DOCUMENTS

| JP | 10059459 | 3/1998 |
|---|---|---|
| JP | 2004-91042 A | 3/2004 |
| WO | 2003-510743 | 3/2003 |

* cited by examiner

*Primary Examiner*—Bryon P Gehman
(74) *Attorney, Agent, or Firm*—Sughrue Mion, PLLC

(57) ABSTRACT

The disk tray of a disk casing is provided with an end portion which has an upper surface facing upward flush with a principal surface of the upper lid when the casing is closed, and an end portion of a lower index card inserted in a space between the disk tray and the lower lid is bent upward along an inner surface of the end wall of the lower lid on the side of the axis. The end wall of the lower lid on the side of the axis is formed to be flush with the upper surface of the end portion of the disk tray so that the upper end of the lower index card is inserted into the slit by way of which the upper edge portion is opposed to an outer edge portion of the end portion of the disk tray.

4 Claims, 3 Drawing Sheets

DISK CASING WITH BENT LOWER INDEX CARD

BACKGROUND OF THE INVENTION

1. Field of the Invention

This invention relates to a disk casing, and more particularly to a disk casing for accommodating a recording medium such as a CD or a DVD.

2. Description of the Related Art

As shown in FIG. 2, a three-piece disk casing 1' which is 10 mm in thickness and has been commonly used comprises a plastic disk tray 3 having at a central portion of an upper surface thereof a disk damper 2 which is engaged with a central opening of a disk (not shown) to removably support the disk, a transparent plastic lower lid 4 which has a flat principal surface (a flat outer surface having a wide area) 4a to removably accommodate and fix the disk tray 3, and a transparent plastic upper lid 5 which has a flat principal surface 5a and is pivoted on the lower lid 4 to be opened and closed about an axis L with respect to the lower lid 4.

The upper lid 5 has a pair of side walls 5b and pair of hinge arms 5c which are extensions of the respective side walls 5b at one end thereof, and short shafts 6a extend inward from the respective hinge arms 5c. By engagement of the short shafts 6a in pivot holes 7 formed in side walls 4b of the lower lid 4 along the axis L, the upper lid 5 is pivoted on the lower lid 4 to be opened and closed about an axis L.

As shown in FIG. 3, the disk tray 3 comprises an elongated end portion 10 which extends along an end wall 11 of the lower lid 4 on the side of the axis L and has an upper surface 10a facing upward substantially flush with the principal surface 5a of the upper lid 5 when the casing 1' is closed and adjacently to the principal surface 5a. The end portion 10 is abutted against an upper end face 11a of the end wall 11 of the lower lid 4 on the side of the axis L and is supported thereby.

An upper index card 12 is held on the back side of the upper lid 5 by a plurality of retainer pieces (not shown) and a lower index card 14 is interposed-between a bottom surface 3a of the disk tray 3 and an inner bottom surface 4c. An end portion of the lower index card 14 on the side of the end portion 10 of the disk tray 3 is bent upward by about 90° along an inner surface 11b of the end wall 11 of the lower lid 4 on the side of the axis L to form a backbone 14a visual from outside through the transparent end wall 11.

However, the lower index card 14 in a 10 mm thick disk casing 1' having such structure is limited in the height h' of the backbone 14a by the height of the end wall 11 of the lower lid 4 from the inner bottom surface 4c thereof and is 6 mm or so at most, and accordingly, what is recorded on the backbone 14a is hard to read. Especially, when a number of disk casings are stacked or are accommodated in a rack in an arranged state, the upper index card 12 held in the upper lid 5 and the part of the lower index card 14 opposed to the principal surface 4a of the lower lid 4 both become invisible and what is recorded on the backbone 14a is harder to read.

In order to overcome this problem, there have been proposed various disk casings. For example, in Japanese Unexamined Patent Publication No. 2004-091042, there has been proposed an optical disk casing in which the end wall of the lower lid 4 outside the back bone on the lower index card 14 is a convex lens. However, this structure is disadvantageous in that the outer contour of the disk casing must be changed, and at the same time, the disk casings employing the structure are harder to store as compared with other standard type disk casings.

Further, the part of the disk casing in the form of the convex lens involves a complicated structure of the molding dye called "undercut". Further, the part of the disk casing in the form of the convex lens deteriorates the productivity when molding the disk casing.

SUMMARY OF THE INVENTION

In view of the foregoing observations and description, the primary object of the present invention is to provide a disk casing in which the visibility of what is recorded on the backbone of the lower index card is improved without changing the outer contour of the disk casing.

In accordance with the present invention, there is provided a disk casing wherein a disk tray to be fixed to a lower lid is provided with an elongated end portion which extends along an end wall of the lower lid on the side of the opening-and-closing axis thereof about which the lower lid is opened and closed and has an upper surface facing upward substantially flush with a principal surface of an upper lid adjacently thereto when the casing is closed, and an end portion of a lower index card inserted in a space between the disk tray-and the lower lid is bent upward along an inner surface of the end wall of the lower lid on the side of the opening-and-closing axis to form a backbone, characterized in that the end wall of the lower lid on the side of the opening-and-closing axis is formed to be substantially flush with the upper surface of the end portion of the disk tray so that the upper edge portion thereof is opposed to an outer edge portion of the end portion of the disk tray by way of a slit, and the upper end of the lower index card is inserted into the slit.

In this case, it is preferred that the surface of the outer edge portion of the end portion of the disk tray which faces the slit comprises a slant surface or an arcuate surface which increases the width of the slit in a downward direction.

Further, it is preferred that a support leg having a lower ends which can contact with the lower index card on the inner bottom surface of the lower lid, is provided on a lower surface of the end portion of the disk tray and is suspended therefrom.

In this specification, "upper and lower", "height" and "horizontal direction" are on the basis of the case where the principal surface of the lower lid is placed on a substantially horizontal surface with the disk casing closed or with the upper lid on the lower lid.

In accordance with the present invention, since the end wall of the lower lid on the side of the opening-and-closing axis is formed to be substantially flush with the upper surface of the end portion of the disk tray so that the upper edge portion thereof is opposed to an outer edge portion of the end portion of the disk tray by way of a slit, and the upper end of the lower index card is inserted into the slit, the height of the backbone of the lower index card, which has been 6 mm or so in the conventional 10 mm thick disk casing, can be 8 to 9 mm, and the visibility of what is recorded on the backbone of the lower index card can be extremely improved especially when a number of disk casings are stacked or are accommodated in a rack in an arranged state.

Further, when the surface of the outer edge portion of the end portion of the disk tray which faces the slit is a slant surface or an arcuate surface which increases downward the width of the slit, the outer edge portion of the end portion becomes less apt to engage with the backbone of the lower index card during assembly of the disk casing.

Further, when a support leg having a lower end which can contact with the lower index card on the inner bottom surface of the lower lid is provided on a lower surface of the end portion of the disk tray to be suspended therefrom, the lower end of the support leg is borne by the inner bottom surface of the lower lid by way of the lower index card when a number of disk casings are stacked or the end portion of the disk tray is applied with load, whereby breakage of the end portion due to a large deflection thereof can be prevented and at the same time, lift of an end portion of the lower index card to cause the backbone thereof to bulge outside the slit is prevented.

DESCRIPTION OF THE PREFERRED EMBODIMENT

Figure 1:
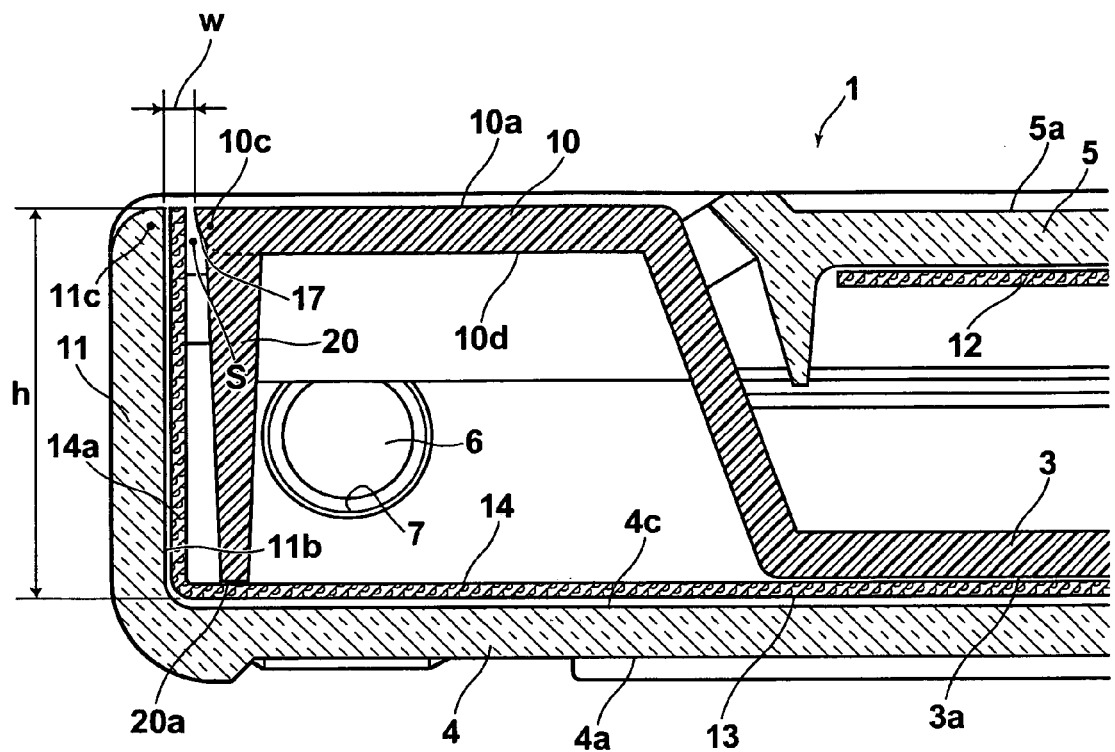
FIG. 1 is an enlarged cross-sectional view showing an important part of a disk casing in accordance with an embodiment of the present invention.
Figure 2:
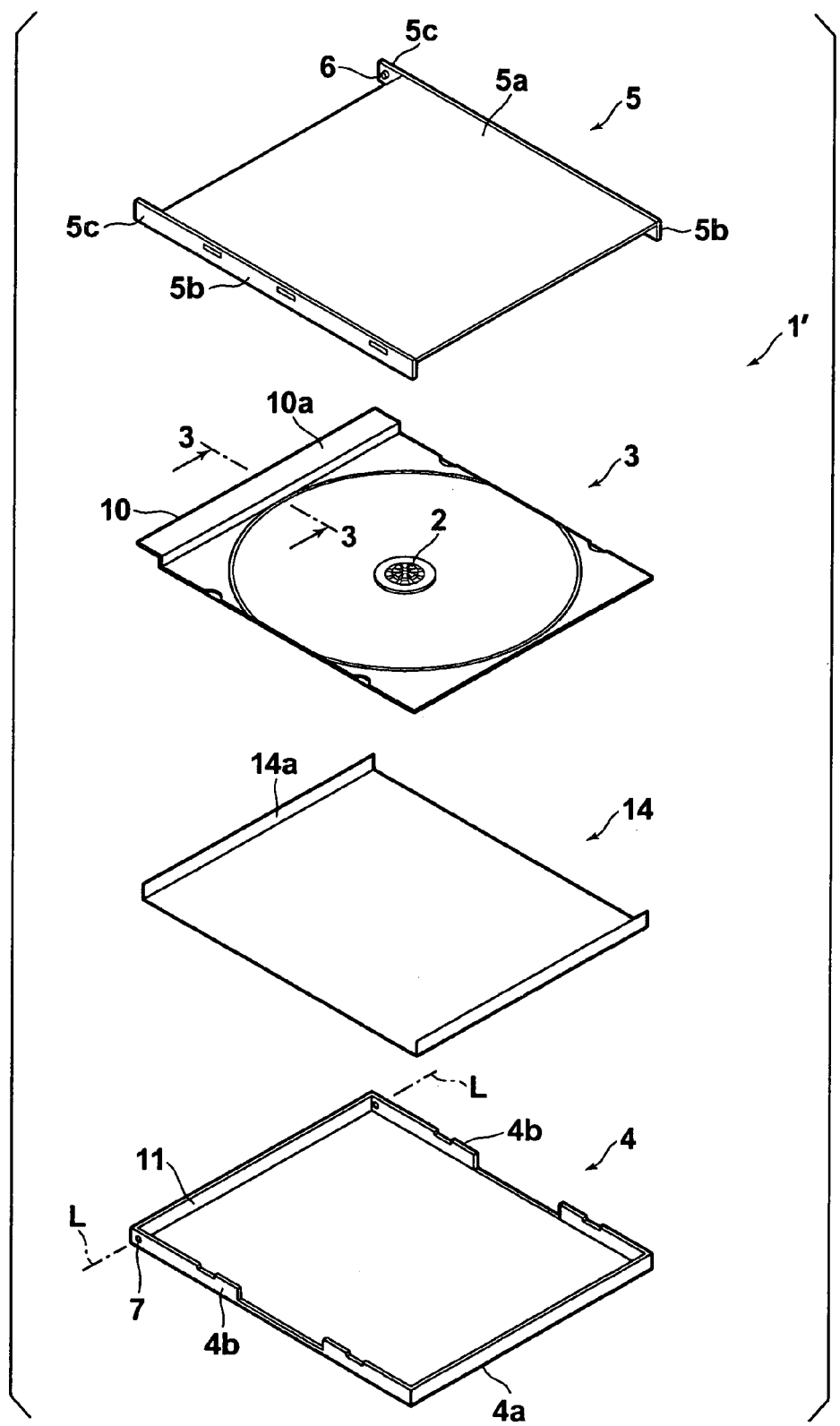
FIG. 2 is an exploded perspective view showing in brief a conventional disk casing in a closed state.

In FIG. 1, elements analogous to those in FIG. 3 will be given the same reference numerals and will not be described here.

Figure 3:
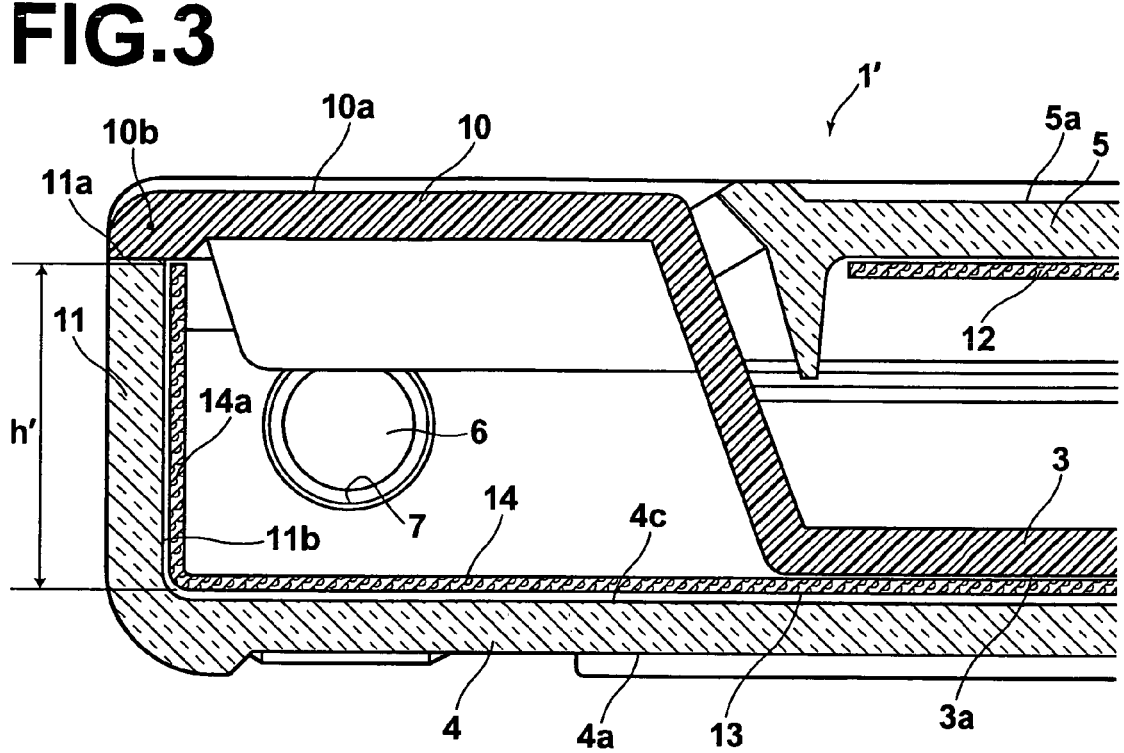
FIG. 3 is an enlarged cross-sectional view showing an important part of the conventional disk casing.

In FIG. 1, in a disk casing 1 in accordance with an embodiment of the present invention, as the conventional disk casing 1' shown in FIG. 3, a disk tray 3 is provided with an elongated end portion 10 having an upper surface 10a facing upward substantially flush with the principal surface 5a of the upper lid 5 when the casing 1 is closed and adjacently to the principal surface 5a. However, in the disk casing 1 of this embodiment, the end portion 10 of the disk tray 3 is narrower in the horizontal width (lateral width in FIG. 1) than in the conventional disk casing 1' so that its outer edge portion 10c is positioned inside the end wall 11 of the lower lid 4 on the side of the axis L.

On the other hand, the end wall 11 of the lower lid 4 is formed high so that its outer edge portion 11c is positioned substantially flush with the upper surface 10a of the end portion 10 of the disk tray 3, and a slit S is formed between the outer edge portion 11c and the outer edge portion 10c of the end portion 10 of the disk tray 3 so that an upper end of the back bone 14a of the lower index card 14 can be inserted into the slit S.

Accordingly, the height h of the back bone 14a of the lower index card 14 may be larger than the conventional height h' shown in FIG. 3 by about 50% thereof so that the upper end of the back bone 14a of the lower index card 14 is inserted into the slit S. That is, the height of the backbone of the lower index card, which has been 6 mm or so in the conventional 10 mm thick disk casing, can be 8 to 9 mm, and the visibility of what is recorded on the backbone of the lower index card can be extremely improved especially when a number of disk casings are stacked or are accommodated in a rack in an arranged state.

Surface 17 of the outer edge portion 10c of the end portion of the disk tray 3 which faces the slit S is a slant surface or an arcuate surface which increases the width of the slit S in a downward direction. With this arrangement, the outer edge portion of the end portion facing the slit S becomes less apt to engage with the upper end of the backbone 14a of the lower index card 14 during assembly of the disk casing 1.

Further, it is preferred that the corner outside the outer edge portion 11c of the end wall 11 of the lower lid 4 forms a slant surface or an arcuate surface. With this arrangement, impact upon drop or collision of the disk casing 1 can be dampened.

Though the more preferred, the larger it is, from the viewpoint of facility of assembly, the narrowest width W of the slit S into which the upper end of the back bone 14a of the lower index card 14 is inserted is more preferred, the smaller it is, from the viewpoint of dust-proof. That is, the narrowest width W is preferably not smaller than 1.5 t and not larger than 6 t (t=the thickness of the lower index card 14:0.12 mm to 0.15 mm) and most preferably not smaller than 2 t and not larger than 4 t.

Further, a support leg 20 having a length which allows the lower end to contact with the lower index card 14 spread on the inner bottom surface 4c of the lower lid 4 is provided on a lower surface 10d of the end portion 10 of the disk tray 3 to be suspended therefrom. The support leg 20 is provided so that the end face 20a thereof is borne by the inner bottom surface 4c of the lower lid 4 by way of the lower index card 14, for instance, when a number of disk casings are stacked or the end portion of the disk tray is applied with load from above, whereby breakage of the end portion due to a large deflection thereof can be prevented. From this viewpoint, it is preferred that the support leg 20 be provided toward the end wall 11 of the lower lid 4 as compared with at the middle of the lateral width of the end portion in FIG. 1. At the same time, the support leg 20 prevents lift of an end portion of the lower index card 14 on the side of the end wall 11 of the lower lid 4 to cause the upper end of the backbone 14a to bulge outside the slit S.

What is claimed is:

1. A flat disk casing comprising a disk tray, a transparent lower lid which fixes the disk tray, and an upper lid which is pivoted on the lower lid to be opened and closed about an opening-and-closing axis wherein the disk tray is provided with an elongated end portion which extends along an end wall of the lower lid on the side of the opening-and-closing axis thereof and has an upper surface facing upward substantially flush with a principal surface of the upper lid adjacently thereto when the casing is closed, and an end portion of a lower index card inserted in a space between the disk tray and the lower lid is bent upward along an inner surface of the end wall of the lower lid on the side of the opening-and-closing axis to form a backbone, characterized in that the end wall of the lower lid on the side of the opening-and-closing axis is formed to be substantially flush with the upper surface of the end portion of the disk tray so that the upper edge portion thereof is opposed to an outer edge portion of the end portion of the disk tray by way of a slit, and the upper end of the lower index card is inserted into the slit.

2. The disk casing as defined in claim 1 in which the surface of the outer edge portion of the end portion of the disk tray which faces the slit comprises one of a slant surface and an arcuate surface which increases the width of the slit in a downward direction.

3. The disk casing as defined in claim 2 in which a support leg having a lower end, which can contact with the lower index card on the inner bottom surface of the lower lid, is provided on a lower surface of the end portion of the disk tray and is suspended therefrom.

4. The disk casing as defined in claim 1 in which a support leg having a lower end, which can contact with the lower index card on the inner bottom surface of the lower lid, is provided on a lower surface of the end portion of the disk tray and is suspended therefrom.

* * * * *